(12) United States Patent
Yasuda et al.

(10) Patent No.: US 7,800,801 B2
(45) Date of Patent: Sep. 21, 2010

(54) TWO-DIMENSIONAL CODING METHOD

(75) Inventors: Shin Yasuda, Ashigarakami-gun (JP);
Jiro Minabe, Ashigarakami-gun (JP);
Katsunori Kawano, Ashigarakami-gun (JP); Yasuhiro Ogasawara, Ashigarakami-gun (JP); Kazuhiro Hayashi, Ashigarakami-gun (JP); Hisae Yoshizawa, Ashigarakami-gun (JP);
Koichi Haga, Ashigarakami-gun (JP);
Makoto Furuki, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1263 days.

(21) Appl. No.: 11/348,488

(22) Filed: Feb. 7, 2006

(65) Prior Publication Data

US 2007/0065019 A1    Mar. 22, 2007

(30) Foreign Application Priority Data

Sep. 20, 2005 (JP) .............................. 2005-272909

(51) Int. Cl.
*G06K 9/36* (2006.01)
*G06H 1/00* (2006.01)
(52) U.S. Cl. .......................................... 359/1; 382/232
(58) Field of Classification Search ......... 382/232–253; 356/457–458; 359/1–35
See application file for complete search history.

(56) References Cited

U.S. PATENT DOCUMENTS 3,742,145 A * 6/1973 Clark et al. ................. 370/505
3,906,465 A * 9/1975 Moriwaki et al. ........... 365/125
4,593,325 A * 6/1986 Kannapell et al. .......... 358/3.22
5,226,096 A * 7/1993 Fan ............................. 382/237
5,251,046 A * 10/1993 Kato et al. ................... 382/237
5,937,090 A * 8/1999 Kim ............................. 382/169
6,064,803 A * 5/2000 Watabe et al. .............. 358/1.17
6,300,553 B2 * 10/2001 Kumamoto et al. ........... 84/622
6,323,956 B1 * 11/2001 Rudak et al. ................. 358/1.2
2003/0107770 A1 * 6/2003 Klatchko et al. ........... 358/3.21
2007/0121185 A1 * 5/2007 Tsukagoshi et al. .......... 359/22

FOREIGN PATENT DOCUMENTS

JP         A 09-197947       7/1997

OTHER PUBLICATIONS

Heanue et al., "Channel Codes for Digital Holographic Data Storage," J. Opt. Soc. Am. A., vol. 12, pp. 2432-2439 {Nov. 1995}.
Minabe et al., "Design of Dye Concentrations in Azobenzene-Containing Polymer Films for Volume Holographic Storage," Japanese Journal of Applied Physics, vol. 43, No. 7B, pp. 4964-4967 {2004}.

* cited by examiner

*Primary Examiner*—Vu Le
*Assistant Examiner*—Alex Liew
(74) *Attorney, Agent, or Firm*—Oliff & Berridge, PLC

(57) ABSTRACT

A two-dimensional coding method includes: using a two-dimensional image containing plural reference pixels each having a different brightness and data pixels representing data in accordance with brightness; and coding a binary sequence of plural bits to be recorded as a hologram by matching the brightness level of the data pixel based on the brightnesses of the plural reference pixels.

29 Claims, 11 Drawing Sheets

FIG.4

- 255 LEVEL: FOURTH LEVEL "11"
- 210 LEVEL: BRIGHTNESS $L_{r3}$ OF REFERENCE PIXEL $R_3$
- 168 LEVEL: THIRD LEVEL "10"
- 126 LEVEL: BRIGHTNESS $L_{r2}$ OF REFERENCE PIXEL $R_2$
- 84 LEVEL: SECOND LEVEL "01"
- 42 LEVEL: BRIGHTNESS $L_{r1}$ OF REFERENCE PIXEL $R_1$
- 0 LEVEL: FIRST LEVEL "00"

FIG.8

| $D_1$ | $D_2$ | $D_3$ | $D_4$ | $D_5$ | $D_6$ |
|---|---|---|---|---|---|
| 11 | 10 | 00 | 00 | 11 | 01 |

# TWO-DIMENSIONAL CODING METHOD

CROSS-REFERENCE TO RELATED APPLICATION

This application claims priority under 35 USC 119 from Japanese Patent Application No. 2005-272909, the disclosure of which is incorporated by reference herein.

BACKGROUND OF THE INVENTION

1. Field of the Invention

The present invention relates to a two-dimensional coding method for holography and more particularly to a two-dimensional coding method for coding binary sequence in correspondence with brightness level of a pixel of a two-dimensional image.

2. Description of the Related Art

In holography technology, signal light and reference light are irradiated to a recording medium, and diffraction grating is formed based on an interference pattern in a recording medium. Then, by irradiating reference light to a recorded hologram, the signal light is reproduced due to diffraction by the hologram. That is, diffracted light from the hologram has the same wave front as the signal light.

The signal light is generated by displaying an image pattern corresponding to digital data, for example, with 0 as a black pixel and 1 as a white pixel, on a spatial light modulator such as a liquid crystal display device and then by intensity-modulating or phase-modulating collimate light. Converting digital data composed of a binary sequence to an image pattern is referred to as two-dimensional coding (Japanese Patent Application Laid-Open (JP-A) No. 9-197947).

Diffracted light from a hologram is detected by a photo detector such as a CCD. A real image of an image pattern is formed on the photo detector. By decoding a binary sequence from this image pattern, digital data is reproduced. If the brightness of the detected pixel (hereinafter referred to as "data pixel") is equal to or over a threshold value, it is determined to be a white pixel and if it is less than the threshold value, it is determined to be a black pixel.

However, it is difficult to set an absolute threshold value because the intensity of diffracted light is difficult to be maintained at a constant level. Thus, by providing an image pattern with a pixel for reference (hereinafter referred to as "reference pixel"), it is determined whether a pixel is a white pixel or a black pixel from a difference between the brightness of the data pixel and the brightness of reference pixel. The coding method using a difference with respect to the reference pixel is generally called "differential coding method".

For example, according to a method referred to as a generalized differential coding method, a pixel for reference is provided, and in each of plural pixels in the neighborhood of the pixel for reference, binary data is expressed. For example, 0, 1 of binary data is expressed with black and white pixels respectively. Upon decoding, a difference is calculated between the brightness of the data pixel and the brightness of the reference pixel, and it is determined whether the difference is positive or negative. Whereby, it is determined whether the value corresponds to 0 or 1 of binary data (J. Opt. Soc. Am. A, 12, 2432 (1995)).

Further, according to a method referred to as a gray scale differential coding method, binary data desired to be recorded is expressed with a gray scale in each of plural pixels in the neighborhood of a reference pixel (A) having the lowest brightness and a reference pixel (B) having the highest brightness. Upon decoding, a ratio of a difference in brightness between the data pixel and the reference pixel (B) with respect to a difference in brightness between the reference pixel (A) and reference pixel (B) is calculated. The brightness of the data pixel expressed with the gray scale is detected by multiplying this ratio by the highest tone that can be displayed. Then, binary data is decoded form the brightness value of the data pixel (J. Opt. Soc. Am. A, 12, 2432 (1995)).

However, a conventional differential coding method has various problems. For example, a generalized differential coding method has such a problem that data amount per page is small because it allows expression of 1-bit with a single data pixel. In the gray scale differential coding method, calculation for detecting the brightness of reproduced pixel is complicated, and additional calculation is required for decoding to original binary data using that brightness. Therefore, there is a problem that decoding process is so complicated that reproduction takes a long time.

SUMMARY OF THE INVENTION

The present invention has been achieved in views of the above and provides a two-dimensional coding method for holography capable of recording and reproducing a large amount of data with a small number of pixels without any complicated decoding process.

According to a first aspect of the present invention, there is provided a two-dimensional coding method including: using a two-dimensional image containing plural reference pixels each having a different brightness and data pixels representing data in accordance with brightness; and coding a binary sequence of plural bits to be recorded as a hologram by matching the brightness level of the data pixel based on the brightnesses of the plural reference pixels.

According to a second aspect of the present invention, there is provided a two-dimensional coding method including: preparing a two-dimensional image having a data area divided into plural sub-data areas containing plural reference pixels each having a different brightness and data pixels representing data in accordance with brightness, the data area being capable of being decoded to the plural sub-data areas; and coding a binary sequence of plural bits to be recorded as a hologram by matching the brightness level of the data pixel based on the brightnesses of the plural reference pixels.

According to a third aspect of the present invention, there is provided a two-dimensional coding method including: using a two-dimensional image containing three kinds of reference pixels each having a different brightness and data pixels representing data in accordance with brightness; setting the brightness levels of the data pixels to four stages with reference to each brightness of the reference pixels; and coding a binary sequence of two bits to be recorded as a hologram by matching with a set brightness level, wherein when respective brightnesses of the three kinds of reference pixels are $L_{r1}$, $L_{r2}$, $L_{r3}$ in ascending order, the brightness $L_d$ of the data pixel is set to the first to fourth level:

| | |
|---|---|
| First level | $L_d < L_{r1}$, |
| Second level | $L_{r1} < L_d < L_{r2}$, |
| Third level | $L_{r2} < L_d < L_{r3}$, |
| Fourth level | $L_{r3} < L_d$. |

The present invention has such an effect that decoding processing is simplified so that a larger number of data can be recorded and reproduced with a smaller number of pixels.

BRIEF DESCRIPTION OF THE DRAWINGS

An embodiment of the present invention will be described in detail based on the following figures, wherein:

FIG. 4 is a diagram showing an example of setting of brightness levels and allocation of binary sequences;

FIG. 8 is a diagram showing binary sequences decoded from the sub-data area shown in FIGS. 3A and 3B;

DETAILED DESCRIPTION OF THE INVENTION

Hereinafter an example of the embodiment of the present invention will be described in detail with reference to the accompanying drawings.

Figure 1:
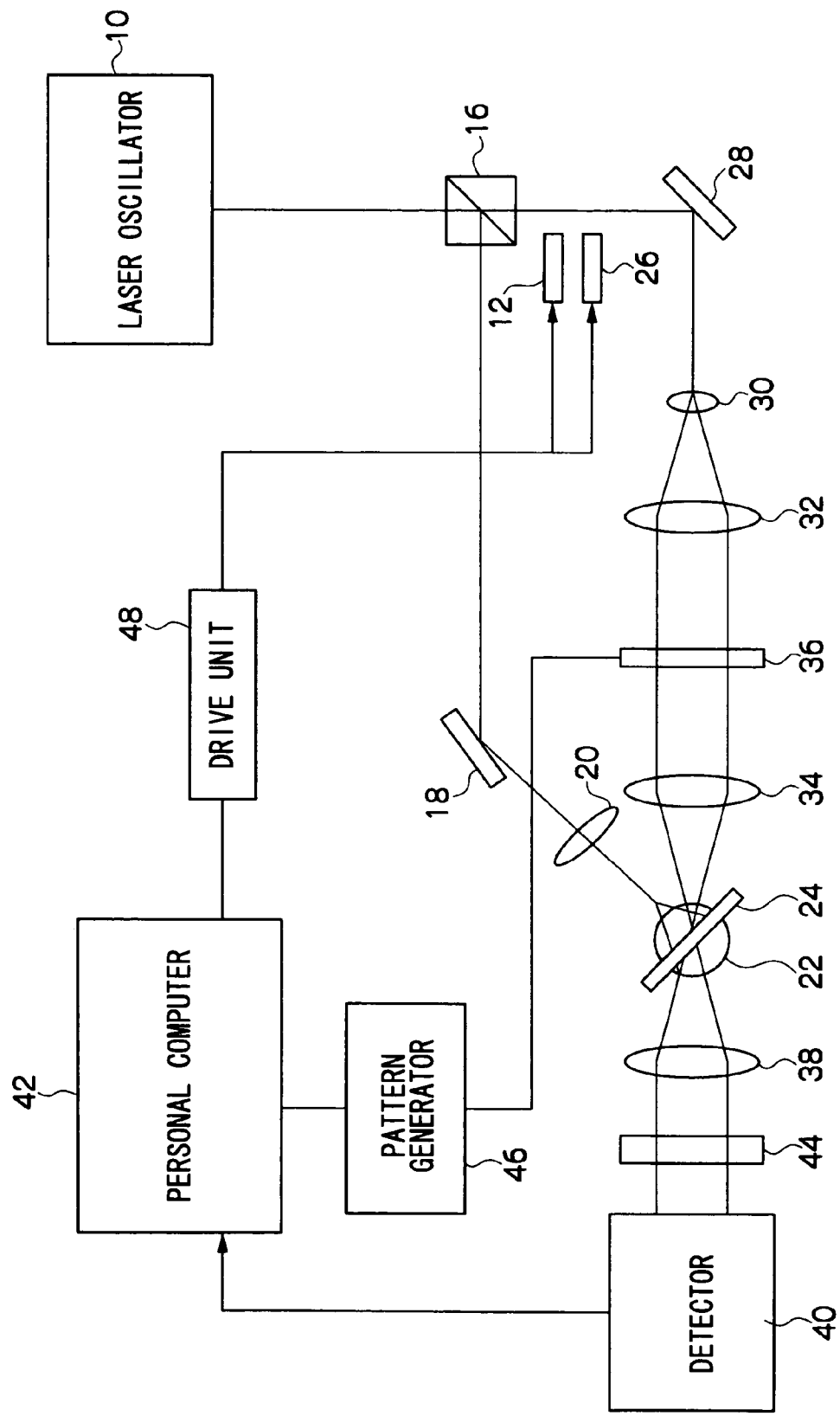
FIG. 1 is a schematic diagram showing the structure of a hologram recording/reproducing apparatus.

FIG. 1 is a schematic diagram showing the structure of a hologram recording/reproducing apparatus.

As shown in FIG. 1, this hologram recording/reproducing apparatus is provided with a laser oscillator 10 using, for example, Nd:YVO$_4$ crystal. Laser beam having a wavelength of 532 nm, which is coherent light, is oscillated and irradiated from the laser oscillator 10. A polarization beam splitter 16 for separating laser beam to light for reference light and light for signal light by transmitting P polarized beam while reflecting S polarized beam is provided on the laser beam irradiation side of the laser oscillator 10.

A reflection mirror 18 for changing light passage in a direction to a hologram recording medium by reflecting laser beam for reference light and an objective lens 20 for generating reference light composed of spherical reference wave by focusing laser beam for reference light are disposed on the light reflection side of the polarization beam splitter 16. A stage 22 for holding a hologram recording medium 24 is provided on the laser beam collection side of this objective lens 20. The objective lens 20 irradiates S polarized beam which is spherical reference light to the hologram recording medium 24 as reference light.

A shutter 12 for blocking P polarized beam transmitted through the polarization beam splitter 16 and a beam rotator 26 for rotating the polarization plane by 90 degrees are disposed on the light transmission side of the polarization beam splitter 16 such that each of them is disposed so as to be inserted into/retracted from an optical passage. A lens system composed of a reflection mirror 28 for changing a light passage to the direction of the hologram recording medium by reflecting laser beam for signal light at a reflection angle of 45 degrees, and lenses 30, 32, 34 is disposed in this order on the light transmission side of the beam rotator 26. A transmission type spatial light modulator 36 which is constituted of a liquid crystal display device or the like for generating signal light for recording each page of a hologram by modulating laser beam for signal light corresponding to a recording signal for each supplied page is disposed between the lens 32 and the lens 34.

The lenses 30, 32 collimate laser beam to beam having a large diameter and irradiate to a spatial light modulator 36 and the lens 34 focuses P polarized beam modulated by the spatial light modulator 36 and transmitted and focused onto the hologram recording medium 24 as signal light. At this time, the signal light is collected so that the focusing spot thereof becomes smaller than that of the reference light and signal light and reference light are irradiated to the hologram recording medium 24 at the same time.

A lens 38, an analyzer 44 which selects and transmits a light of a predetermined polarization direction from reproduced light (for example, 0° polarization component, 45° polarization component or 90° polarization component), and a light detector 40 which is constituted of an imaging device such as CCD for converting received reproduced light to electric signal and outputs it are disposed on the reproduced light transmission side of the hologram recording medium 24. The light detector 40 is connected to a personal computer 42.

The personal computer 42 is connected to the spatial light modulator 36 through a pattern generator 46, which generates a pattern corresponding to a recording signal supplied at a predetermined timing from the personal computer. To the personal computer 42 is connected a drive unit 48 which drives the shutter 12 and the beam rotator 26 to be inserted into light passage separately and retracts the shutter 12 or the beam rotator 26 inserted into the light passage from the light passage separately.

The hologram recording medium (optical recording medium) 24 is constituted of optical recording material formed into a thick film of 100 μm or more in thickness. As the optical recording material, any material may be used as long as it is photorefractive material or polarization responsive material indicating a photoinduced refractive index change or photoinduced dichroism and maintaining the photoinduced refractive index change or photoinduced dichroism under a normal temperature. However, polymer having a radical for photoisomerization at its side chain, for example, at least a polymer selected from polyester group and has a radical for photoisomerization at its side chain, for example, material having azobenzene frame is preferable.

To record hologram using the hologram recording/reproducing apparatus shown in FIG. 1, first, the drive unit (not shown) is driven so as to retract the shutter 12 from light passage to allow laser beam to pass. Next, laser beam is irradiated form the laser oscillator 10 and a recording signal for each page is supplied from the personal computer 42 to the spatial light modulator 36 at a predetermined timing so as to execute hologram recording processing to the hologram recording medium 24.

In other words, laser beam emitted from the laser oscillator 10 impinges upon the polarization beam splitter 16 and the laser beam is separated to two beams of beam for reference light (S polarized beam) and beam for signal light (P polarized beam) by the polarization beam splitter 16. The P polarized beam transmitted through the polarization beam splitter 16 is reflected by the reflection mirror 28 and collimated by the lenses 30, 32 and projected to the spatial light modulator

36. Beam irradiated to the spatial light modulator 36 is modulated corresponding to a recording signal by the spatial light modulator 36 so as to generate signal light. The generated signal light of P polarized beam is collected by the lens 34 and irradiated to the hologram recording medium 24.

On the other hand, the S polarized beam reflected by the polarization beam splitter 16 is reflected by the reflection mirror 18 and collected by the lens 20 so as to generate reference light composed of spherical reference wave. The generated reference light of S polarized beam is irradiated to the hologram recording medium 24 from the same side as the signal light. When the signal light and reference light are irradiated at the same time in this way, changes in refractive index or absorption occur at a place in which the lights intensify each other by interference of the signal light and reference light and little change occurs at a place in which the lights weaken each other. Hologram recording for each page is carried out by using this phenomenon. In this case, transmission type hologram, which enables high density recording in its thickness direction, is recorded in the hologram recording medium 24 by irradiating the signal light and reference light from the same side of the hologram recording medium 24.

Next, to reproduce a recorded hologram using the hologram recording/reproducing apparatus shown in FIG. 1, first, the drive unit (not shown) is driven so as to insert the shutter 12 into the light passage. Because laser beam passing the polarization beam splitter 16 is blocked by the shutter 12, only the reference light is irradiated to the hologram recording medium 24 in which hologram has been recorded. Further, the S polarized beam reflected by the polarization beam splitter 16 is reflected by the reflection mirror 18, collected by the lens 20 and irradiated to the hologram recording medium 24.

Reproduced light diffracted by the hologram recording medium 24 passes through the lens 38 and is received by the light detector 40 through the analyzer 44. The reproduced light received by the light detector 40 is converted to electric signal and inputted to the personal computer 42 and displayed on a display (not shown) provided on the personal computer. As a consequence, hologram image of each page is reproduced.

Figure 2:
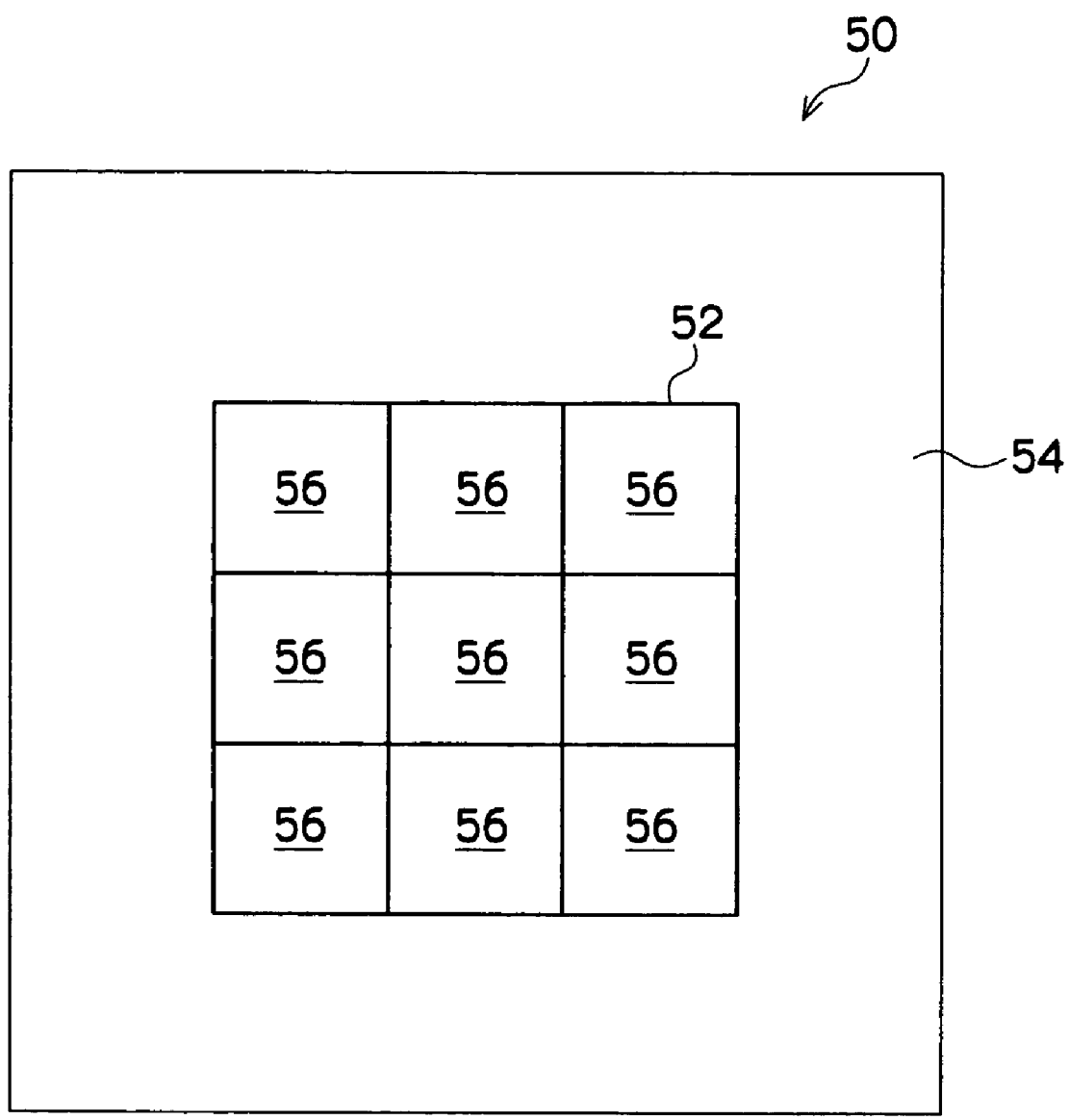
FIG. 2 is a diagram showing a data page displayed on a spatial light modulator.

FIG. 2 is a diagram showing an image pattern (hereinafter referred to as "data page") of each page displayed on the spatial light modulator 36 described above.

The data page 50 is constituted of a data area 52, which represents recorded data, and a blank area 52 formed around the data area 52. The data area 52 is divided into plural sub-data areas 56 and the plural sub-data areas 56 are two-dimensionally arranged in the data area 52. According to this embodiment, nine sub-data areas 56 are arranged in a matrix of 3×3 in the data area 52.

Figure 3A:
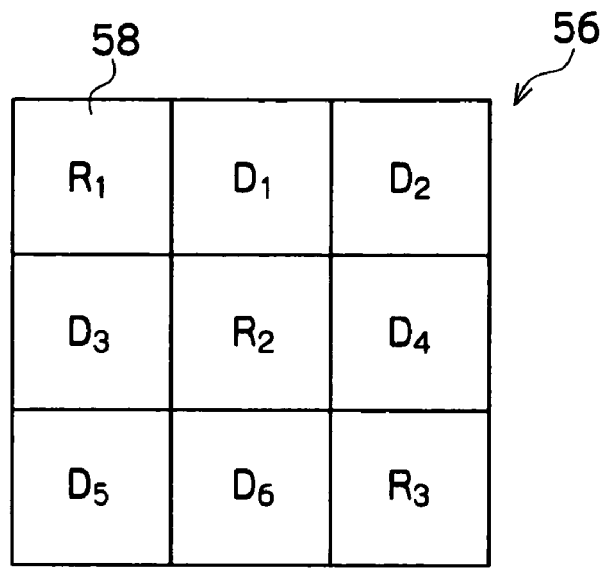
FIGS. 3A and 3B are diagrams showing a pixel arrangement in a sub-data area.
Figure 3B:
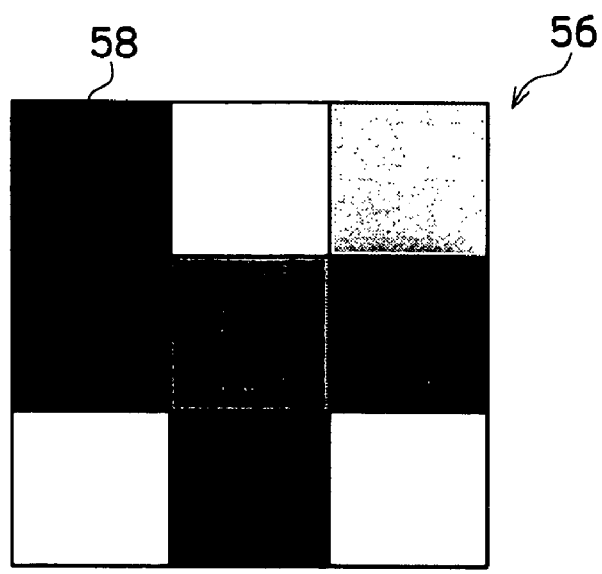

FIGS. 3A and 3B are diagrams showing a pixel arrangement of the sub-data area.

Plural pixels 58 are two-dimensionally arranged in the sub-data area 56. According to this embodiment, nine pixels 58 are arranged in a matrix of 3×3 in the sub-data area 56. The nine pixels 58 are constituted of three reference pixels $R_1$, $R_2$, $R_3$ each having a different brightness and six data pixels $D_1$, $D_2$, $D_3$, $D_4$, $D_5$, $D_6$. Although in this example of the arrangement, the three reference pixels $R_1$, $R_2$, $R_3$ are disposed on a diagonal line of the matrix, they may also be disposed at different positions. FIG. 3A is a diagram showing the arrangement of respective pixels and FIG. 3B is a diagram showing brightness distribution.

FIG. 4 is a diagram showing an example of setting of brightness levels and allocation of binary sequences.

If the brightnesses of the three reference pixels $R_1$, $R_2$, $R_3$ are set to $L_{r1}$, $L_{r2}$, $L_{r3}$ in ascending order, the brightness $L_d$ of a data pixel can be set to the following first to fourth levels based on the brightness of the reference pixels.

| | |
|---|---|
| First level: | $L_d < L_{r1}$ |
| Second level: | $L_{r1} < L_d < L_{r2}$ |
| Third level: | $L_{r2} < L_d < L_{r3}$ |
| Fourth level: | $L_{r3} < L_d$ |

Binary sequences of plural bits to be recorded as a hologram may be coded corresponding to the brightness level of the above-mentioned data pixels. If the four stages of the brightness levels are set as described above, a binary sequence "00" is matched with the first level, a binary sequence "01" is matched with the second level, a binary sequence "10" is matched with the third level and a binary sequence "11" is matched with the fourth level. That is, a 2-bit binary sequence is matched with each brightness level.

Assuming that the maximum tone possible to express is 256 tones, the lowest brightness is 0 while the highest brightness is 255. If it is assumed that the brightness of a pixel of a data page displayed on the spatial light modulator 36 is in proportion to the intensity of light transmitted through that pixel, when respective brightnesses of the three reference pixels are assumed to be 42, 126, 210 in ascending order, the brightness of the first level can be allocated to 0, the brightness of the second level can be allocated to 84, the brightness of the third level can be allocated to 168 and the brightness of the fourth level can be allocated to 255.

Figure 5:
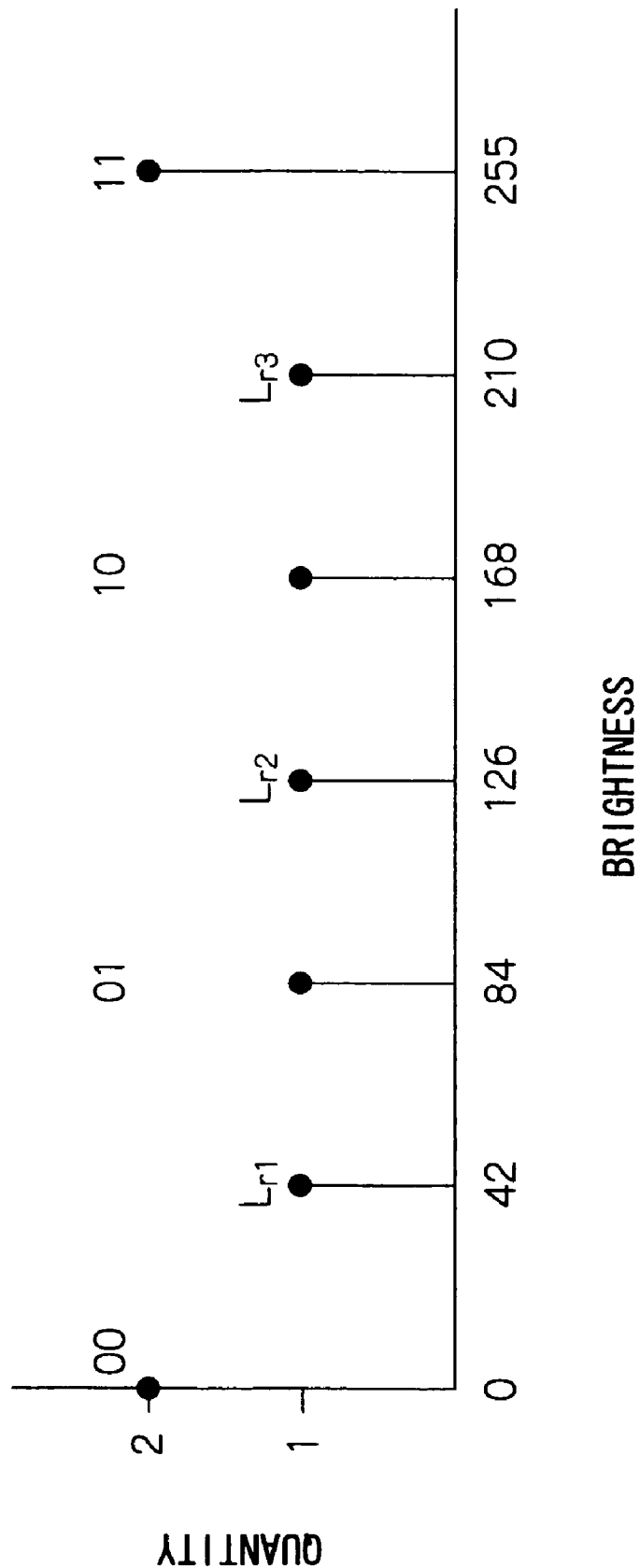
FIG. 5 is a diagram showing a brightness distribution of the sub-data area shown in FIGS. 3A and 3B.

FIG. 5 is a diagram showing a brightness distribution of the sub-data area shown in FIGS. 3A and 3B.

Brightnesses $L_{r1}$, $L_{r2}$, $L_{r3}$ of the three reference pixels $R_1$, $R_2$, $R_3$ are 42, 126, 210, respectively. Brightnesses $L_{d1}$, $L_{d2}$, $L_{d3}$, $L_{d4}$, $L_{d5}$, $L_{d6}$ of six data pixels $D_1$, $D_2$, $D_3$, $D_4$, $D_5$, $D_6$ are 255, 168, 0, 0, 255, 84, respectively. The brightness distribution of nine pixels included in the sub-data area 56 is as shown in FIG. 5.

Figure 6:
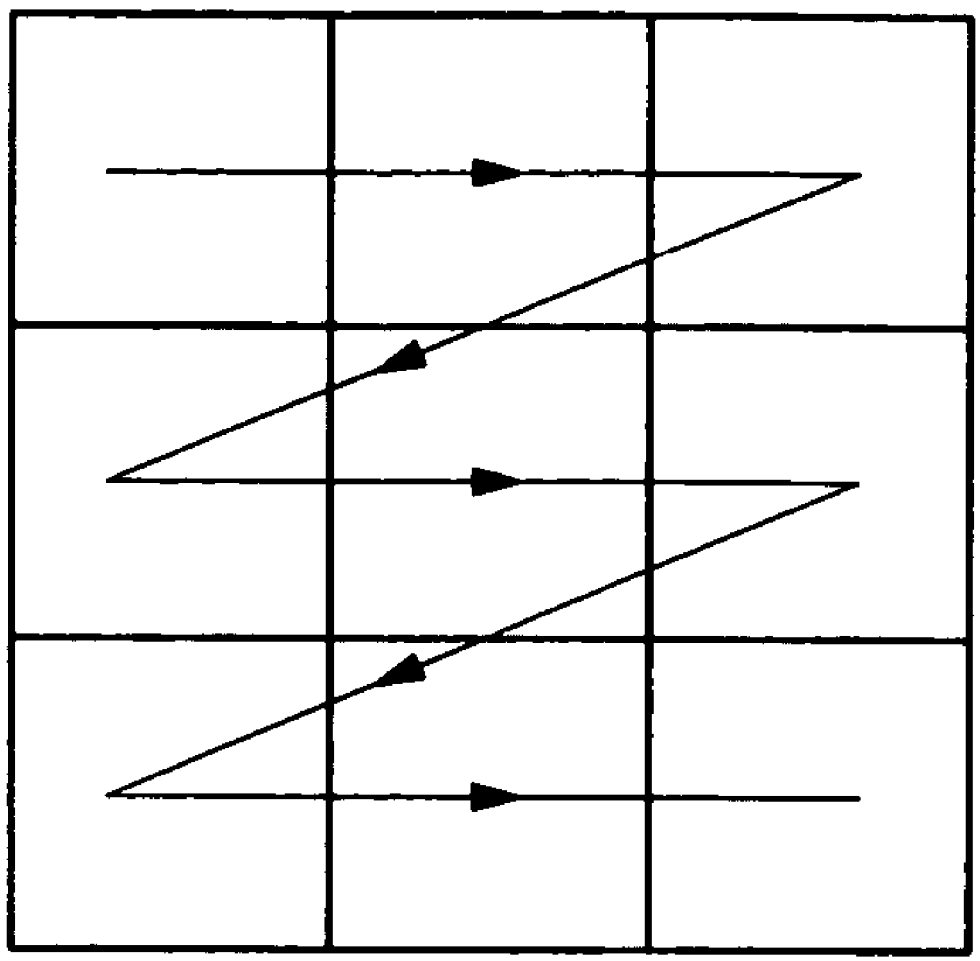
FIG. 6 is a diagram showing the decoding order of the data pixels in the sub-data area shown in FIGS. 3A and 3B.

FIG. 6 is a diagram showing the decoding order of data pixels in the sub-data area shown in FIGS. 3A and 3B.

Light diffracted from the hologram is detected by a light detector such as a CCD. A real image of an image pattern is formed on the light detector. Digital data is reproduced by decoding from this image pattern to a binary sequence. As shown in FIG. 6, plural data pixels contained in the sub-data area 56 of the output image from the light detector are decoded in a predetermined order. According to this embodiment, six data pixels $D_1$, $D_2$, $D_3$, $D_4$, $D_5$, $D_6$ contained in the sub-data area 56 are decoded in the order of $D_1 \rightarrow D_2 \rightarrow D_3 \rightarrow D_4 \rightarrow D_5 \rightarrow D_6$.

Figure 7:
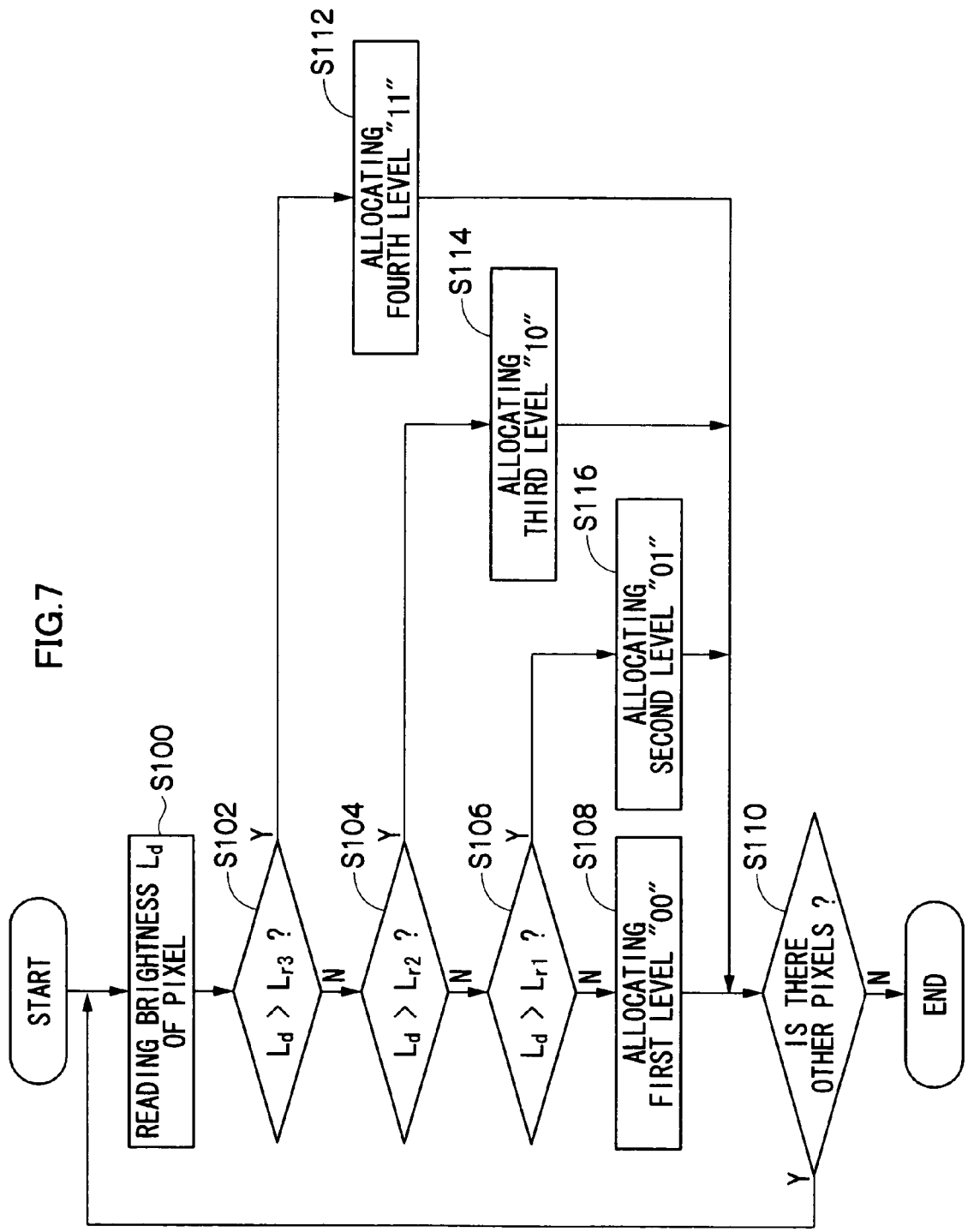
FIG. 7 is a flow chart showing a routine for decoding process.

Next, decoding process for decoding from the sub-data area to a binary sequence will be described. The sub-data area is decoded by comparing the brightnesses of the reference pixel and the data pixel. That is, the decoding is carried out by determining whether or not the brightness of the data pixel is larger than the brightness of each reference pixel. FIG. 7 is a flow chart showing a routine of decoding process to be executed by a computer. This processing routine is started when detection data is inputted from the light detector at the time of reproduction of a hologram.

First, a brightness value $L_d$ of a data pixel is read in step 100 and whether or not the inputted brightness value $L_d$ is larger than brightness $L_{r3}$ of a reference pixel is determined in step 102. The brightness $L_{r3}$ indicates the largest value of the brightnesses $L_{r1}$, $L_{r2}$, $L_{r3}$ of the reference pixels $R_1$, $R_2$, $R_3$. In the case of affirmative determination, the brightness value $L_d$ of the data pixel is at the fourth level, and therefore, a binary sequence "11" is allocated in step 112 and the procedure proceeds to step 110. In the case of negative determination, the procedure proceeds to the next step 104.

In the next step 104, whether or not the inputted brightness value $L_d$ is larger than the brightness $L_{r2}$ of the reference pixel is determined. The brightness $L_{r2}$ indicates the second largest value of the brightnesses $L_{r1}$, $L_{r2}$, $L_{r3}$. In the case of affirmative determination, the brightness $L_d$ of the data pixel is at the third level, and therefore, a binary sequence "10" is allocated in step 114 and the procedure proceeds to step 110. In the case of negative determination, the procedure proceeds to the next step 106.

In the next step 106, whether or not the inputted brightness value $L_d$ is larger than the brightness value $L_{r1}$ of the reference pixel is determined. The brightness $L_{r1}$ indicates the smallest value of the brightnesses $L_{r1}$, $L_{r2}$, $L_{r3}$. In the case of affirmative determination, the brightness value $L_d$ of the data pixel is at the second level, a binary sequence "01" is allocated in step 116 and the procedure proceeds to step 110. Because in the case of negative determination, the brightness value $L_d$ of the data pixel is at the first level, a binary sequence "00" is allocated in step 108 and the procedure proceeds to the next step 110.

In the next step 110, whether or not the next data pixel exists is determined. In the case of affirmative determination, the procedure returns to step 100, in which the brightness value $L_d$ of the next data pixel is read and steps 102-108 are repeated. In the case of negative determination in step 110, the routine is ended.

Figure 8:
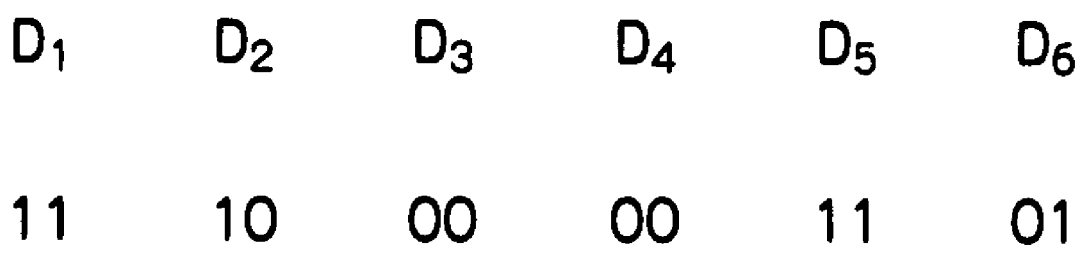

FIG. 8 is a diagram showing binary sequences decoded from the sub-data area shown in FIGS. 3A and 3B. When the above-described decoding process is executed, the six data pixels are decoded in a predetermined order. The brightnesses of the six data pixels $D_1$, $D_2$, $D_3$, $D_4$, $D_5$, $D_6$ are 255, 168, 0, 0, 255, 84, respectively. The respective brightness levels of the data pixels $D_1$, $D_2$, $D_3$, $D_4$, $D_5$, $D_6$ are matched with 2-bit binary sequences 11, 10, 00, 00, 11, 01 and a 12-digit binary sequence of "111000001101" is decoded.

As described above, according to this embodiment, the sub-data area is of a multi-value image pattern, but not of a binary image pattern, and three kinds of reference pixels each having a different brightness are provided in the sub-data area. Therefore, a 2-bit binary sequence can be matched with a single data pixel contained in the sub-data area, so that the amount of data to be recorded in each page can be increased.

Further, the decoding process is carried out by determining whether or not the brightness of the data pixel is larger than the brightness of each reference pixel in succession, and therefore, the decoding process is easier than the conventional gray scale differential coding method.

Although in the above embodiment, a case where nine pixels are arranged in a matrix of 3×3 in a sub-data area has been described, a case where (m×n) pixels are arranged in a matrix of m rows and n columns in a sub-data area will be described. For example, nine pixels may be arranged in a matrix of 1×9. If it is assumed that one reference pixel having q kinds of brightness levels is provided in each sub-data area, and the quantity of digits in binary number which can be expressed by a single data pixel is p digits, the relation with the quantity of the reference pixels q can be expressed in the following (1).

$$p \leq \log_2(q+1) \quad (1)$$

As p, the largest integer which satisfies the relation (1) is selected. Particularly, when a quantity of the reference pixels q satisfies the relation (2) below, equality in the relation (1) is established so that p=s. To minimize the quantity of the reference pixels q when p is set constant, the following relation (2) needs to be satisfied.

$$q = 2^s - 1 \,(s \text{ is a positive integer}) \quad (2)$$

Generally, a quantity of binary digits r, which can be displayed in a single sub-data area, is expressed in the following relation (3).

$$r = (mn - q)p \quad (3)$$

As evident from these relation (1)-(3), the quantity of digits p which can be expressed with a single data pixel can be increased by increasing the quantity of the reference pixels q contained in the sub-data area, that is, the quantity of the reference pixels q each having a different brightness.

In the above case of m=n=3, q=3 (p=2), the quantity of total pixels in the sub-data area m×n is 9, the quantity of digits which can be expressed with a single data pixel p is 2, the quantity of the reference pixels q is 3 and the quantity of digits of binary number which can be expressed r is 12. In this way, a single data pixel can be provided with information of plural bits by using three or more reference pixels, and only by comparing with the brightness of the reference pixel without complicated computation, data having the information of plural bits can be read out.

To reproduce multi-value brightness with a good reproducibility, it is preferable that the distribution of intensity of light incident upon each sub-data area indicated on the spatial light modulator is uniform. Actually, since incident light possesses Gaussian distribution type intensity distribution, the size of the sub-data area (m×n) is preferably specified corresponding to the quantity of the reference pixels q. The size of the sub-data area (m×n) is preferred to be in a range of q×q to 4q×4q and more preferred to be in a range of q×q to 2q×2q.

Figure 9:
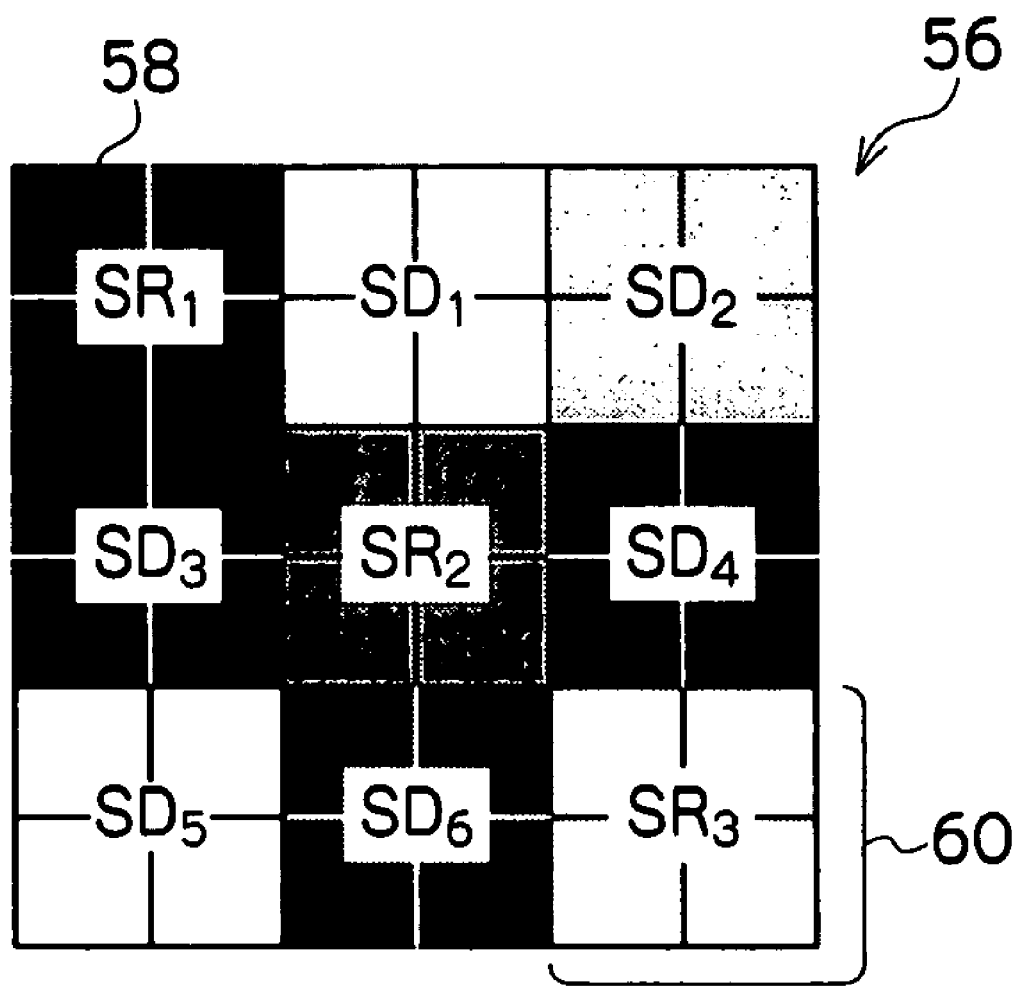
FIG. 9 is a diagram showing another example of the pixel arrangement in the sub-data area.

Although in the above embodiment, an example has been described in which individual pixels in the sub-data area are used as the reference pixels and data pixels, it is also possible to use a cell composed of plural pixels as a reference cell and a data cell and set the brightness of each cell. FIG. 9 is a diagram showing another example of the pixel arrangement in the sub-data area. In this example, thirty-six pixels 58 are arranged in a matrix of 6×6 in the sub-data area 56 and the thirty-six pixels 58 are divided into plural cells 60.

One kind of data (tone level) is set in four pixels 58 in each cell 60. The brightnesses of three reference cells $SR_1$, $SR_2$, $SR_3$ are 42, 126, 210, respectively, and the brightnesses of six data cells $SD_1$, $SD_2$, $SD_3$, $SD_4$, $SD_5$, $SD_6$ are 255, 168, 0, 0, 255, 84, respectively.

Experiments of displaying data page containing the sub-data area shown in FIG. 9 on the spatial light modulator, recording a hologram in the hologram recording medium and reproducing the recorded hologram are carried out using a hologram recording/reproducing apparatus having the same structure as shown in FIG. 1. A reproduced image is photographed with the CCD used as a light detector so that a pixel in the spatial light modulator is matched with a pixel of the CCD. Its experimental condition is as follows.

Wavelength of recorded light and reading light: 532 nm
Recording light energy: 178 mJ/cm$^2$
Reading light energy: 1 mJ/cm$^2$
Recording medium material: azo polymer
Recording medium thickness: 250 μm As the above-mentioned azo polymer, the azo polymer described in Jpn. J. Appl. Phys. 43(2004) 4964 is used.

Figure 10:
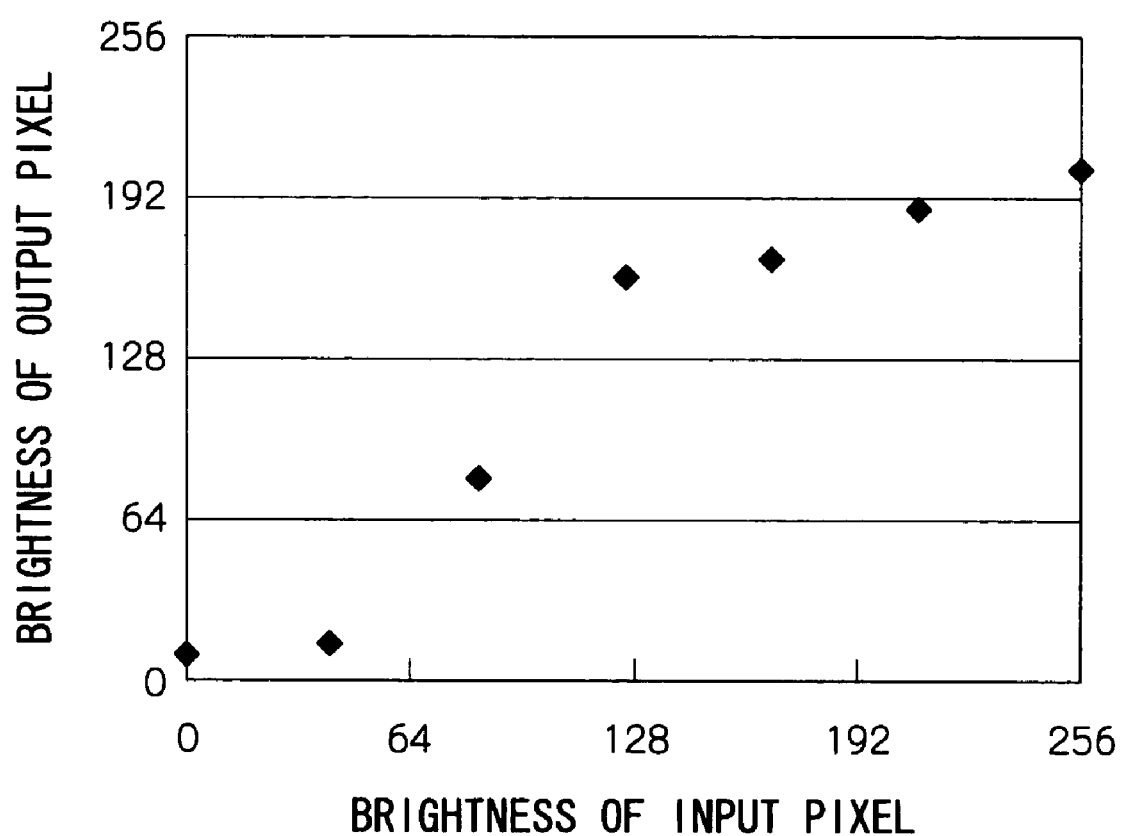
FIG. 10 is a diagram showing a correlation between brightness of input pixel when data page including the sub-data area shown in FIG. 9 is displayed on a spatial light modulator and brightness of output pixel of an image pattern detected by a photo detector.

FIG. 10 is a diagram showing a correlation between the brightness of input pixels when data page is displayed on the spatial light modulator and the brightness of output pixels of an image pattern detected by the light detector 40. As evident from FIG. 10, the brightness of the output pixel increases as the brightness of the input pixel increases. This result indicates that the binary sequence can be decoded from the sub-data area by comparing the brightness of the data pixel with the brightness of the reference pixel. Although in this experiment, the brightness of the output pixel indicates nonlinearity originated from the spatial light modulator because the brightness level of the input pixel is set at a substantially equal interval, brightness interval of the output pixels can be equalized by determining the brightness interval of the input pixels considering this nonlinearity. This can improve an SN ratio.

Figure 11:
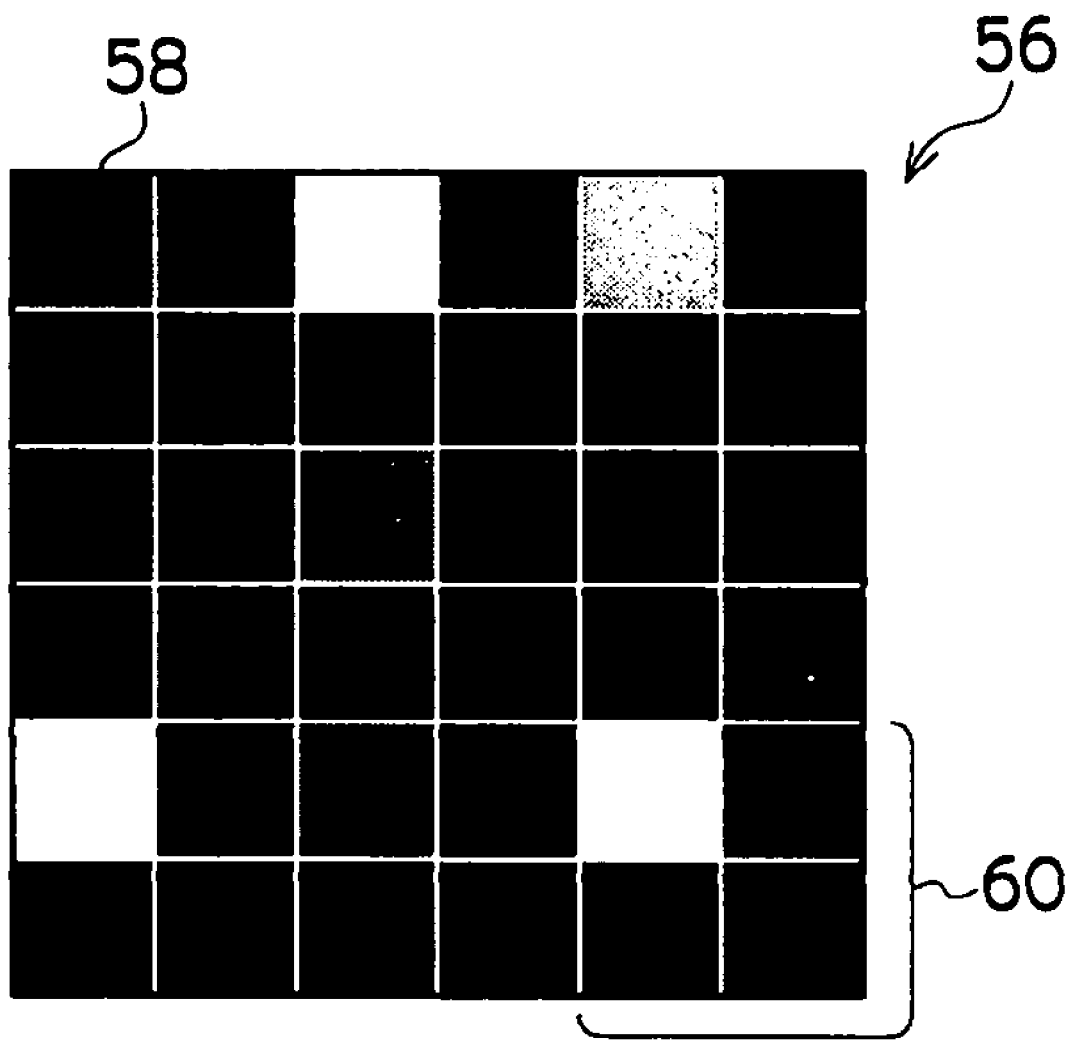
FIG. 11 is a diagram showing still another example of the pixel arrangement of the sub-data area.

FIG. 11 is a diagram showing another example of the pixel arrangement in the sub-data area. In this example, one kind of data (brightness level) is set at four pixels 58 in each cell 60. For example, a single pixel disposed on the top left of a reference cell $SR_1$ is a reference pixel $R_1$ and the brightness of the reference pixel $R_1$ is 42. Similarly to the above, data is set to a pixel disposed on the top left of a cell composed of four pixels for each of the reference cells $SR_1$, $SR_2$, $SR_3$ and data cells $SD_1$, $SD_2$, $SD_3$, $SD_4$, $SD_5$, $SD_6$. Durability to cross-talk and deviation in position of the CCD can be provided by setting data on part of pixels in a cell. In the meantime, as for the pixels in which no data is set, it is preferable to set the brightness to level 0 in order to block light from being transmitted.

What is claimed is:

1. A two-dimensional coding method comprising:
   reconstructing a two-dimensional image recorded as a hologram by a hologram reconstructing apparatus, the two-dimensional image containing a plurality of reference pixels each having a brightness, wherein the different brightnesses of the plurality of reference pixels determines brightness levels, and data pixels representing data according to a set of codes associated with the brightness levels; and
   comparing a brightness of each data pixel of the reconstructed two-dimensional image with the different brightnesses of the plurality of reference pixels and coding each data pixel according to a code associated with a brightness level of the data pixel.

2. The two-dimensional coding method of claim 1 wherein when p bits are expressed with one of the data pixels using q kinds of the reference pixels, the p is a maximum integer that satisfies a relation of $p \leq \log_2 (q+1)$.

3. The two-dimensional coding method of claim 2 wherein the q satisfies a relation of $q = 2^s - 1$ (s is an integer of 2 or larger).

4. The two-dimensional coding method of claim 3 wherein when respective brightnesses of the q kinds of reference pixels are $L_{r1}, L_{r2}, \ldots L_{rq}$ in ascending order, the brightness $L_d$ of the data pixel is set to the first to (q+1)th level as following:

| First level | $L_d < L_{r1}$, |
|---|---|
| Second level | $L_{r1} < L_d < L_{r2}$, |
| ..., | |
| q level | $L_{rq-1} < L_d < L_{rq}$, |
| q + 1 level | $L_{rq} < L_d$. |

5. The two-dimensional coding method of claim 1 wherein three or more kinds of reference pixels are used.

6. The two-dimensional coding method of claim 3 wherein the brightness levels of the data pixels are set to four stages with reference to the respective brightnesses of the reference pixels using three kinds of reference pixels each having a different brightness and a 2-bit binary sequence is coded by matching with a set brightness level.

7. The two-dimensional coding method of claim 6 wherein when respective brightnesses of three kinds of reference pixels are $L_{r1}, L_{r2}, L_{r3}$ in ascending order, the brightness $L_d$ of the data pixel is set to the first to fourth level as following:

| First level | $L_d < L_{r1}$, |
|---|---|
| Second level | $L_{r1} < L_d < L_{r2}$, |
| Third level | $L_{r2} < L_d < L_{r3}$, |
| Fourth level | $L_{r3} < L_d$. |

8. The two-dimensional coding method of claim 7 wherein a binary sequence "00" is matched with the first level, a binary sequence "01" is matched with the second level, a binary sequence "10" is matched with the third level and a binary sequence "11" is matched with the fourth level.

9. The two-dimensional coding method of claim 7 wherein the first to fourth levels are allocated to brightnesses of 256 tones.

10. The two-dimensional coding method of claim 9 wherein when respective brightnesses of three kinds of reference pixels are 42, 126, 210 respectively, the brightness of the first level is allocated to 0, the brightness of the second level is allocated to 84, the brightness of the third level is allocated to 168 and the brightness of the fourth level is allocated to 255.

11. The two-dimensional coding method of claim 1 wherein the data area of the two-dimensional image is divided into a plurality of reference pixels each having a different brightness and a plurality of sub-data areas containing the data pixels so that each sub-data area is capable of being decoded.

12. The two-dimensional coding method of claim 11 wherein three reference pixels each having a different brightness and six data pixels are arranged in the sub-data area in a matrix of 3×3.

13. The two-dimensional coding method of claim 1 wherein the decoding order of the data pixels contained in the two-dimensional image is set preliminarily.

14. The two-dimensional coding method of claim 11 wherein in each of the plurality of sub-data areas, a cell composed of a plurality of pixels is made to be reference cell and data cell, brightness is set for each cell, and one kind of tone level is set for the plurality of pixels in each cell.

15. The two-dimensional coding method of claim 14 wherein, of the plurality of pixels in the cell, one pixel is a reference pixel and the brightness of a pixel in which no data is set is made to be zero level.

16. The two-dimensional coding method of claim 11 wherein when q kinds of the reference pixels are used, the size of each of the plurality of sub-data areas is in a range of q×q to 4q×4q.

17. A hologram recording method comprising:
   generating a signal light representing page data to be recorded in a hologram recording medium using a two-dimensional image containing a plurality of reference pixels each having a different brightness, wherein the different brightnesses of the plurality of reference pixels determines brightness levels, and data pixels representing digital data according to a set of binary codes associated with the brightness levels; and recording the page data by simultaneously irradiating the signal light and a reference light that is coherent with the signal light onto the hologram recording medium.

18. The hologram recording method of claim 17 wherein when p bits are expressed with one of the data pixels using q kinds of the reference pixels, the p is a maximum integer that satisfies a relation of $p \leq \log_2 (q+1)$.

19. The hologram recording method of claim 18 wherein the q satisfies a relation of $q=2^s-1$ (s is an integer of 2 or larger).

20. The hologram recording method of claim 19 wherein when respective brightnesses of the q kinds of reference pixels are $L_{r1}, L_{r2}, \ldots L_{rq}$ in ascending order, the brightness $L_d$ of the data pixel is set to the first to (q+1)th level as following:

| First level | $L_d < L_{r1}$, |
| Second level | $L_{r1} < L_d < L_{r2}$, |
| ..., | |
| q level | $L_{rq-1} < L_d < L_{rq}$, |
| q + 1 level | $L_{rq} < L_d$. |

21. The hologram recording method of claim 17 wherein three or more kinds of reference pixels are used.

22. The hologram recording method of claim 19 wherein the brightness levels of the data pixels are set to four stages with reference to the respective brightnesses of the reference pixels using three kinds of reference pixels each having a different brightness and a 2-bit binary sequence is coded by matching with a set brightness level.

23. The hologram recording method of claim 22 wherein when respective brightnesses of three kinds of reference pixels are $L_{r1}, L_{r2}, L_{r3}$ in ascending order, the brightness $L_d$ of the data pixel is set to the first to fourth level as following:

| First level | $L_d < L_{r1}$, |
| Second level | $L_{r1} < L_d < L_{r2}$, |
| Third level | $L_{r2} < L_d < L_{r3}$, |
| Fourth level | $L_{r3} < L_d$. |

24. The hologram recording method of claim 23 wherein a binary sequence "00" is matched with the first level, a binary sequence "01" is matched with the second level, a binary sequence "10" is matched with the third level and a binary sequence "11" is matched with the fourth level.

25. The hologram recording method of claim 23 wherein the first to fourth levels are allocated to brightnesses of 256 tones.

26. The hologram recording method of claim 25 wherein when respective brightnesses of three kinds of reference pixels are 42, 126, 210 respectively, the brightness of the first level is allocated to 0, the brightness of the second level is allocated to 84, the brightness of the third level is allocated to 168 and the brightness of the fourth level is allocated to 255.

27. The hologram recording method of claim 17 wherein the data area of the two-dimensional image is divided into a plurality of reference pixels each having a different brightness and a plurality of sub-data areas containing the data pixels so that each sub-data area is capable of being decoded.

28. The hologram recording method of claim 27 wherein three reference pixels each having a different brightness and six data pixels are arranged in the sub-data area in a matrix of 3×3.

29. The hologram recording method of claim 17 wherein the decoding order of the data pixels contained in the two-dimensional image is set preliminarily.

\* \* \* \* \*